US011935078B2

(12) United States Patent
Price et al.

(10) Patent No.: US 11,935,078 B2
(45) Date of Patent: *Mar. 19, 2024

(54) INTELLIGENT DEALERSHIP RECOMMENDATION ENGINE

(71) Applicant: Capital One Services, LLC, McLean, VA (US)

(72) Inventors: Micah Price, The Colony, TX (US); Qiaochu Tang, Frisco, TX (US); Geoffrey Dagley, McKinney, TX (US); Avid Ghamsari, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/405,794

(22) Filed: Aug. 18, 2021

(65) Prior Publication Data

US 2021/0374616 A1    Dec. 2, 2021

Related U.S. Application Data

(63) Continuation of application No. 16/871,662, filed on May 11, 2020, now Pat. No. 11,126,931.

(51) Int. Cl.
| *G06Q 30/0202* | (2023.01) |
| *G06N 5/025* | (2023.01) |
| *G06N 7/01* | (2023.01) |
| *G06N 20/00* | (2019.01) |
| *G06F 18/214* | (2023.01) |

(52) U.S. Cl.
CPC ......... *G06Q 30/0202* (2013.01); *G06N 5/025* (2013.01); *G06N 7/01* (2023.01); *G06N 20/00* (2019.01); *G06F 18/214* (2023.01)

(58) Field of Classification Search
None
See application file for complete search history.

(56) References Cited

U.S. PATENT DOCUMENTS

| 7,526,439 B2 | 4/2009 | Freishtat et al. |
| 8,256,668 B2 | 9/2012 | Bennett et al. |
| 10,902,448 B2 | 1/2021 | Munjal |
| 10,997,612 B2 | 5/2021 | Amano et al. |
| 11,029,972 B2 | 6/2021 | Vichare et al. |
| 11,080,727 B1 | 8/2021 | Novak et al. |
| 2003/0154142 A1 | 8/2003 | Ginsburg et al. |
| 2006/0190122 A1 | 8/2006 | Loeb |

(Continued)

OTHER PUBLICATIONS

Arevalillo JM. A machine learning approach to assess price sensitivity with application to automobile loan segmentation. Applied Soft Computing. Mar. 1, 2019;76:390-9. (Year: 2019).*

(Continued)

*Primary Examiner* — Vincent Gonzales
(74) *Attorney, Agent, or Firm* — Banner & Witcoff, Ltd.

(57) ABSTRACT

Aspects described herein may provide an interface and/or search functionality for a dealership to determine vehicles a customer is most likely to purchase. A recommender system may generate vehicle recommendations for a dealership to sell to a customer based on customer information, vehicle information, and dealership information. Machine learning may be used to generate the recommendations. The recommendations may be based on the vehicle preferences of a customer.

20 Claims, 4 Drawing Sheets

(56) References Cited

U.S. PATENT DOCUMENTS

| | | |
|---|---|---|
| 2010/0274631 A1 | 10/2010 | McFall et al. |
| 2011/0282814 A1 | 11/2011 | Koister |
| 2012/0016772 A1 | 1/2012 | Sadagopan et al. |
| 2013/0325541 A1 | 12/2013 | Capriotti et al. |
| 2014/0156343 A1 | 6/2014 | Olsen et al. |
| 2014/0229214 A1 | 8/2014 | Bernier et al. |
| 2015/0134420 A1 | 5/2015 | Unser et al. |
| 2015/0350435 A1 | 12/2015 | Connolly et al. |
| 2016/0292705 A1 | 10/2016 | Ayzenshtat et al. |
| 2016/0292769 A1* | 10/2016 | Colson .................. G06N 20/00 |
| 2016/0371756 A1 | 12/2016 | Yokel et al. |
| 2017/0236131 A1 | 8/2017 | Nathenson et al. |
| 2019/0172112 A1 | 6/2019 | Sierocki |
| 2019/0362290 A1 | 11/2019 | Rogynskyy et al. |
| 2020/0050997 A1 | 2/2020 | Fox et al. |
| 2020/0184272 A1 | 6/2020 | Zhang et al. |
| 2020/0242466 A1 | 7/2020 | Mohassel et al. |
| 2020/0311561 A1 | 10/2020 | Naaman et al. |
| 2021/0086089 A1 | 3/2021 | Pardeshi et al. |

OTHER PUBLICATIONS

Dunham, Nancy, "Balancing front end, F&I to maximize profit", downloaded from https://www.autonews.com/article/20170313/FINANCE_AND_INSURANCE/303139987/balancing-front-end-f-i-to-maximize-profit, Automotive News, Mar. 13, 2017, 8 pages.

Kavinkumar, V. et al., "A hybrid approach for recommendation system with added feedback component", 2015 International Conference on Advances in Computing, Communications and Informatics (ICACCI), Aug. 10-13, 2015, pp. 745-52. (Year: 2015).

Luo, X., Y. Xia, and Q. Zhu, "Incremental collaborative filtering recommender based on regularized matrix factorization", Knowledge-Based Systems, vol. 27, Mar. 2012, pp. 271-280. (Year: 2012).

Vargas, S. and P. Castells, "Rank and relevance in novelty and diversity metrics for recommender systems", RecSys'11, Oct. 23-27, 2011, pp. 109-116. (Year: 2011).

2018, Mark Colosimo, A Data Driven and Mixed Methods Analysis of Automotive Retail Operations Management, Wayne State University.

* cited by examiner

INTELLIGENT DEALERSHIP RECOMMENDATION ENGINE

CROSS-REFERENCE TO RELATED APPLICATIONS

The instant application is a continuation of U.S. patent application Ser. No. 16/871,662, titled "Intelligent Dealership Recommendation Engine," filed May 11, 2020, the disclosure of which is hereby incorporated by reference in its entirety. This application is also related to the following U.S. Patent Applications, filed on May 11, 2020:

U.S. patent application Ser. No. 16/871,875, titled "INTELLIGENT DEALERSHIP RECOMMENDATION ENGINE."

The entirety of each of the related applications is incorporated by reference herein for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to machine learning. More specifically, aspects of the disclosure may provide for a recommendation engine that recommends vehicles and/or sales associates.

BACKGROUND

Dealerships often work with a financing company that provides a loan to a customer, allowing the customer to purchase a vehicle from the dealership. The financing company may have a complicated proprietary pricing model that the financing company keeps secret. The pricing model may be used to determine the loan structure for a customer and vehicle combination based on a variety of factors. However, it may be difficult for dealerships to determine which vehicles may be eligible for financing (e.g., are in policy) for a particular customer and which in policy loan structures may meet customer preferences.

Further, sales associates at a dealership may excel at selling different types of vehicles to different types of customers. It may be difficult for a dealership to determine which sales associate to use for a particular customer because of the many different factors involved. Aspects described herein may address these and other problems, and generally improve recommendation engines to recommend vehicles and sales associates at a dealership.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide an interface and/or search functionality for a dealership to determine which vehicles to recommend to a customer that may likely result in an agreeable loan structure for financing the vehicle. A recommender system may generate vehicle recommendations for a dealership to sell to a customer based on customer information, vehicle information, and dealership information. Machine learning may be used to generate the recommendations. The recommendations may be based both on dealer preferences (e.g., dealer preferred loan structures), and the vehicle and financing preferences of a customer. The recommendations may improve the dealership's ability to determine a vehicle that a customer is likely to purchase and may improve the efficiency of the vehicle purchasing process.

More particularly, some aspects described herein may provide a computer-implemented method for recommending vehicles. The method may comprise receiving, from a user device, customer information corresponding to a customer; determining, based on the customer information, a first set of vehicles that the customer is predicted to qualify for financing (e.g. prequalified for financing); receiving dealership information comprising an inventory of a vehicle dealership; determining a second set of vehicles, which is in the inventory of the vehicle dealership, wherein the second set of vehicles is a subset of the first set of vehicles; determining a value for each vehicle within the second set of vehicles, wherein the value indicates a probability that the vehicle dealership is predicted to complete a purchase of a corresponding vehicle to the customer, and wherein the value is determined based on a pricing model, the customer information, the dealership information, and vehicle information; generating a list of vehicles, sorted by the value for each vehicle; and outputting the list of vehicles to a computing device associated with the vehicle dealership. The probability may indicate one or more customer preferences that the vehicle matches. The probability may indicate a loan structure that is approved by the vehicle dealership. The customer information may comprise a credit score, a location of the customer, budgetary preferences of the customer (e.g. an amount to finance, a monthly payment, etc.) and information indicating an income level of the customer.

The method may further include modifying, based on a machine learning model and the customer information, the list of vehicles before outputting the list. The machine learning model may be trained using data generated by the pricing model, and the data may include historical vehicle information, historical customer information, and historical dealership information.

The method may further include receiving additional customer information from a second user device associated with the vehicle dealership; and updating, based on the additional customer information and the pricing model, the list of vehicles. The method may further include receiving information indicating a vehicle, from the list of vehicles, which is associated with the customer; receiving product information indicating front end purchases for the vehicle; and generating, based on the product information, a list of product combinations for the vehicle. The list of product combinations may be sorted by a likelihood that the customer will purchase each product combination within the list of product combinations or other factors that may be selected by the end user. The product information may further indicate back end purchases for the vehicle. A vehicle's position within the list of vehicles may be adjusted based on a random variable prior to outputting the list.

A computer-implemented method may comprise receiving, from a user device, customer information corresponding to a customer; determining, based on the customer information, a first set of vehicles that the customer is qualified for or is predicted to qualify for financing; receiving dealership information comprising an inventory of a vehicle dealership; determining a second set of vehicles, which is in the inventory of the vehicle dealership, wherein the second set of vehicles is a subset of the first set of vehicles; training a machine learning model using training data comprising historical customer information, historical dealership information, and historical vehicle information; determining a value for each vehicle within the second set of vehicles, wherein the value indicates a probability that the vehicle dealership is predicted to complete a purchase of a corresponding vehicle to the customer, and wherein the value is determined based on the machine learning model, the customer information, the dealership information, and vehicle information; generating a list of vehicles, sorted by the value for each vehicle; and outputting the list of vehicles to a computing device associated with the vehicle dealership. The training data may be generated in part by a pricing model. The probability may indicate one or more customer preferences that the vehicle matches.

The computer-implemented method may further include receiving customer preference information indicating features of a preferred vehicle of the customer; and updating the list of vehicles, based on inputting the customer preference information into the machine learning model. The customer preference information may include vehicles viewed online by the customer and second vehicle information saved by the customer. A position of a vehicle within the list of vehicles may be based on a likelihood, determined by the machine learning model, that the customer will purchase the vehicle.

The computer-implemented method may further include receiving additional customer information from a second user device associated with the vehicle dealership; and updating, based on the additional customer information and the machine learning model, the list of vehicles.

The computer-implemented method may further include receiving information indicating a vehicle, from the list of vehicles, that is associated with the customer; receiving product information indicating front end purchases for the vehicle; and generating, based on the product information, a list of product combinations for the vehicle, wherein the list of product combinations is sorted by a likelihood that the customer will purchase each product combination within the list of product combinations. The product information may further indicate back end purchases for the vehicle.

Some aspects described herein may provide computer-readable media for recommending vehicles. For example, non-transitory media may store instructions that, when executed by one or more processors, cause the one or more processors to perform steps including receiving, from a user device, customer information corresponding to a customer; receiving, from the user device, preference information corresponding to the customer, wherein the preference information indicates vehicle features associated with the customer; determining, based on the customer information, a first set of vehicles that the customer is prequalified for financing; receiving dealership information comprising an inventory of a vehicle dealership; determining a second set of vehicles, which is in the inventory of the vehicle dealership, wherein the second set of vehicles is a subset of the first set of vehicles; determining, based on a machine learning model, an order of the second set of vehicles, wherein the order is based on a probability that the vehicle dealership is predicted to complete a purchase with the customer for each vehicle within the second set of vehicles, and wherein the order is based on the preference information; generating, based on the order, a list of vehicles; outputting the list of vehicles to a computing device associated with the vehicle dealership; receiving sales data corresponding to a vehicle purchase of the customer; and updating the machine learning model based on the sales data.

Corresponding apparatus, systems, method, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
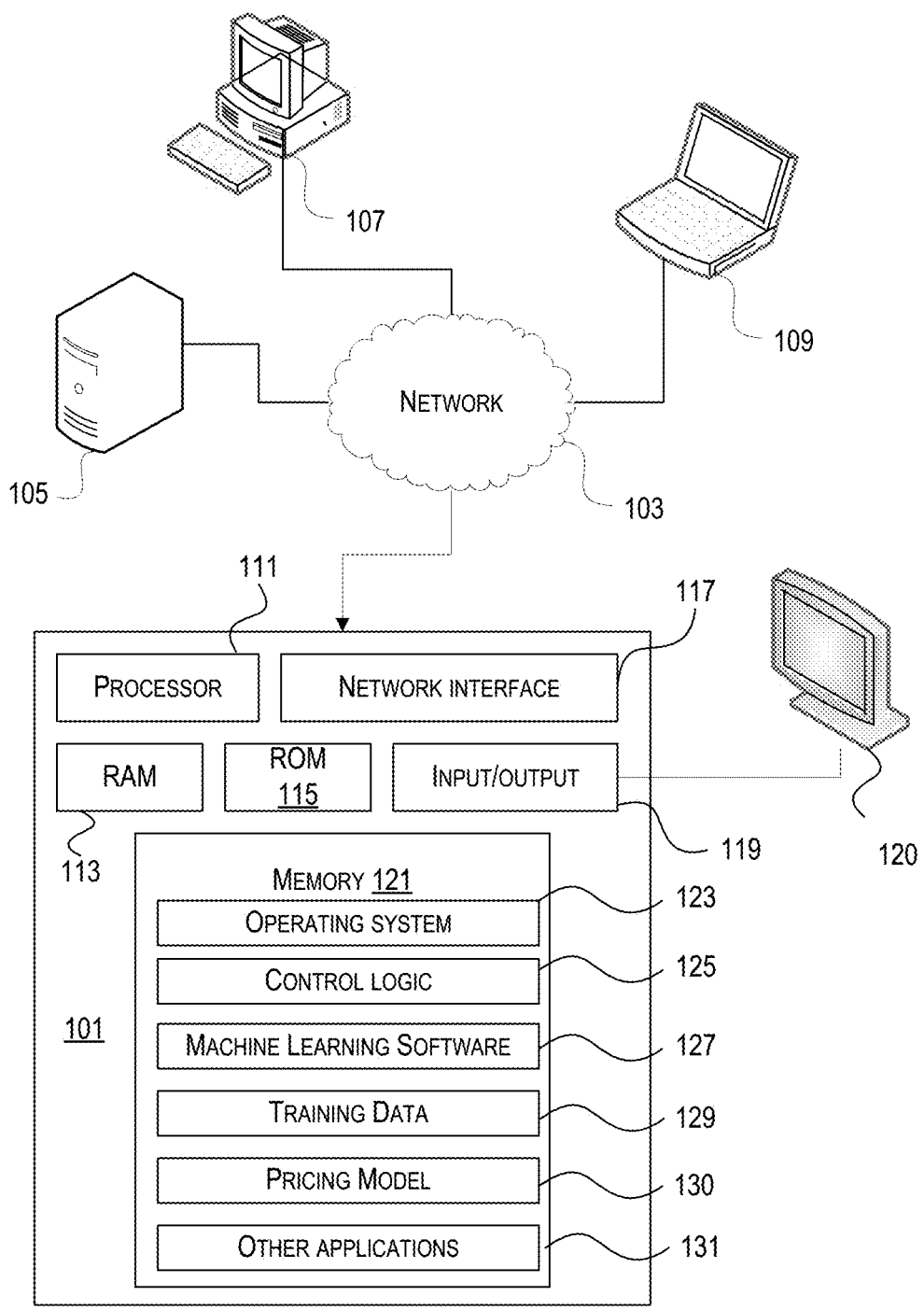
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In other embodiments, computing device 101 may operate in a networked environment. As shown in FIG. 1, various network devices (or nodes) 101, 105, 107, and 109 may be interconnected via a network 103, such as the Internet. Other types of networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other wired or wireless communication media.

As seen in FIG. 1, computing device 101 may include a processor 111, RAM 113, ROM 115, network interface 117, input/output interfaces (I/O) 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training data 129, pricing model 130, and other applications 131. Control logic 125 may be incorporated in and may be a part of machine learning software 127 and/or pricing model 130. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125, machine learning software 127, and/or pricing model 130.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, HTML, or XML. The computer executable instructions may be stored on a computer-readable medium such as a hard disk, optical disk, removable storage media, solid state memory, RAM, etc.

In addition, the functionality described herein may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a system and method for intelligently recommending vehicles and sales associates to a dealership and/or customer.

Figure 2:
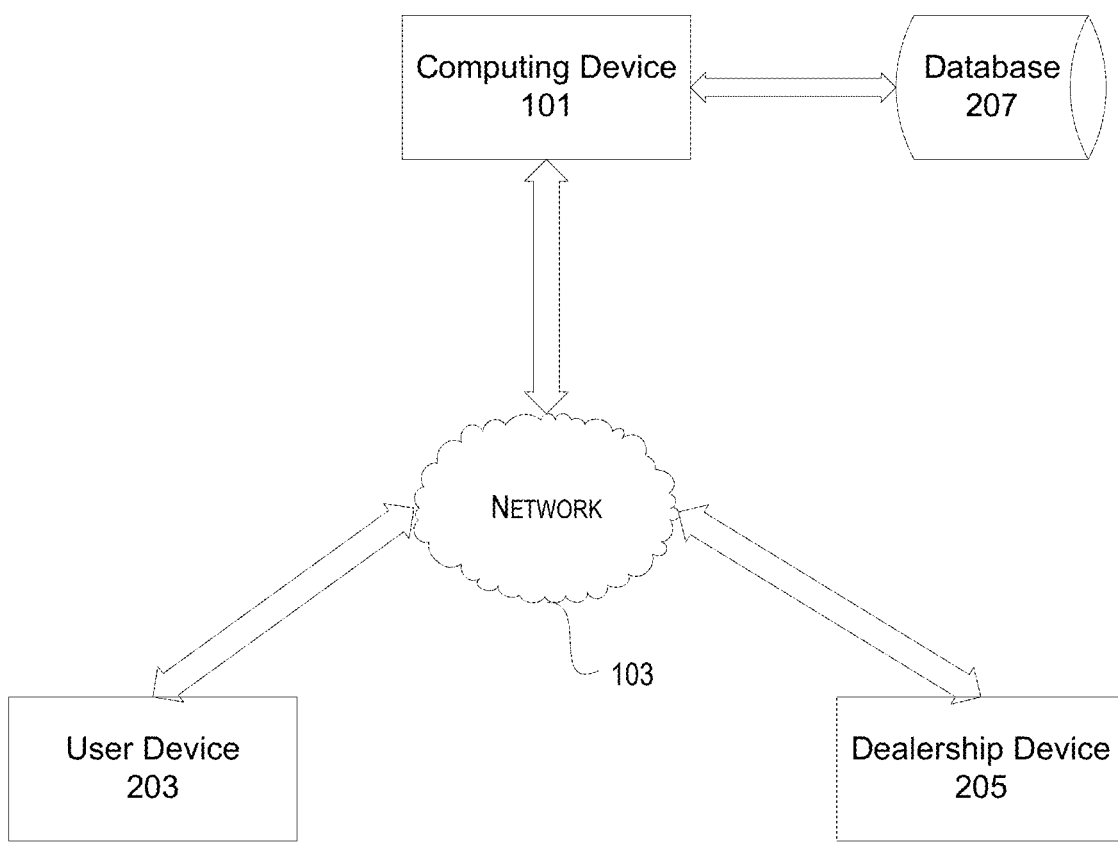
FIG. 2 depicts an example intelligent dealership recommendation system according to one or more aspects of the disclosure.

FIG. 2 illustrates an example recommendation system 200. Any component within the recommendation system 200 may comprise, and/or may be a part of, any component described in FIG. 1. The recommendation system 200 may comprise one or more computing devices. For example, the recommendation system 200 may comprise one or more components such as computing device 101, user device 203, dealership device 205, and/or database 207.

Computing device 101 may be configured to generate vehicle recommendations based on customer, vehicle, and dealership information. Computing device 101 may be configured to generate sales associate recommendations based on customer, vehicle, and dealership information. The recommendations may be designed to recommend a vehicle to a customer that meets customer preferences and results in a loan structure agreeable (e.g., acceptable, the customer/dealership is more likely than not to accept and purchase/sell the vehicle given the loan structure, etc.) to the customer, the dealership and/or the financial company associated with computing device 101. The recommendations may be designed to maximize the likelihood that a customer purchases the vehicle that is recommended. Computing device 101 may receive customer information from user device 203 and dealership information from dealership device 205 (e.g., via network 103). Computing device 101 may store customer, vehicle, and dealership information in database 207. Training data 129 may be stored in database 207. Computing device 101 may use pricing model 130 to determine a loan amount and loan details (e.g. a loan package or structure) to give to a customer based on the customer and the vehicle. In some embodiments, the loan package may be based on dealership information as well. Computing device 101 may use pricing model 130 to determine certain loan details (e.g. an annual percentage rate, length or loan term, monthly payment) charged for a loan for the customer.

User device 203 and dealership device 205 may be any type of device including smartphone, personal digital assistant, laptop computer, tablet computer, desktop computer, smart home device, listening device, infotainment head unit of a vehicle, and/or other computing device configured to perform one or more functions described herein. User device 203 and dealership device 205 may receive input from users (e.g., customers that are interested in purchasing a vehicle, sales associates at dealerships, etc.) and may send the input to computing device 101. For example, a potential customer may enter information on user device 203 while searching for a vehicle to purchase. Additional information about the customer (e.g., vehicle preferences, demographic information, information requested for prequalification, etc.) may be entered on user device 203 and/or on dealership device 205, when the customer visits a dealership.

The recommendation system 200 may provide a technological solution to assist dealerships in determining a vehicle that matches the customer preferences. The recommender system 200 may provide a dealership information about the customer prior to the customer arriving at the dealership, which may allow the dealership to better assist and use less of the customer's time. The recommender system 200 may identify a vehicle from the dealership inventory that matches the customer's information and/or may show the dealership the inventory that is most relevant to the customer.

Figure 3:
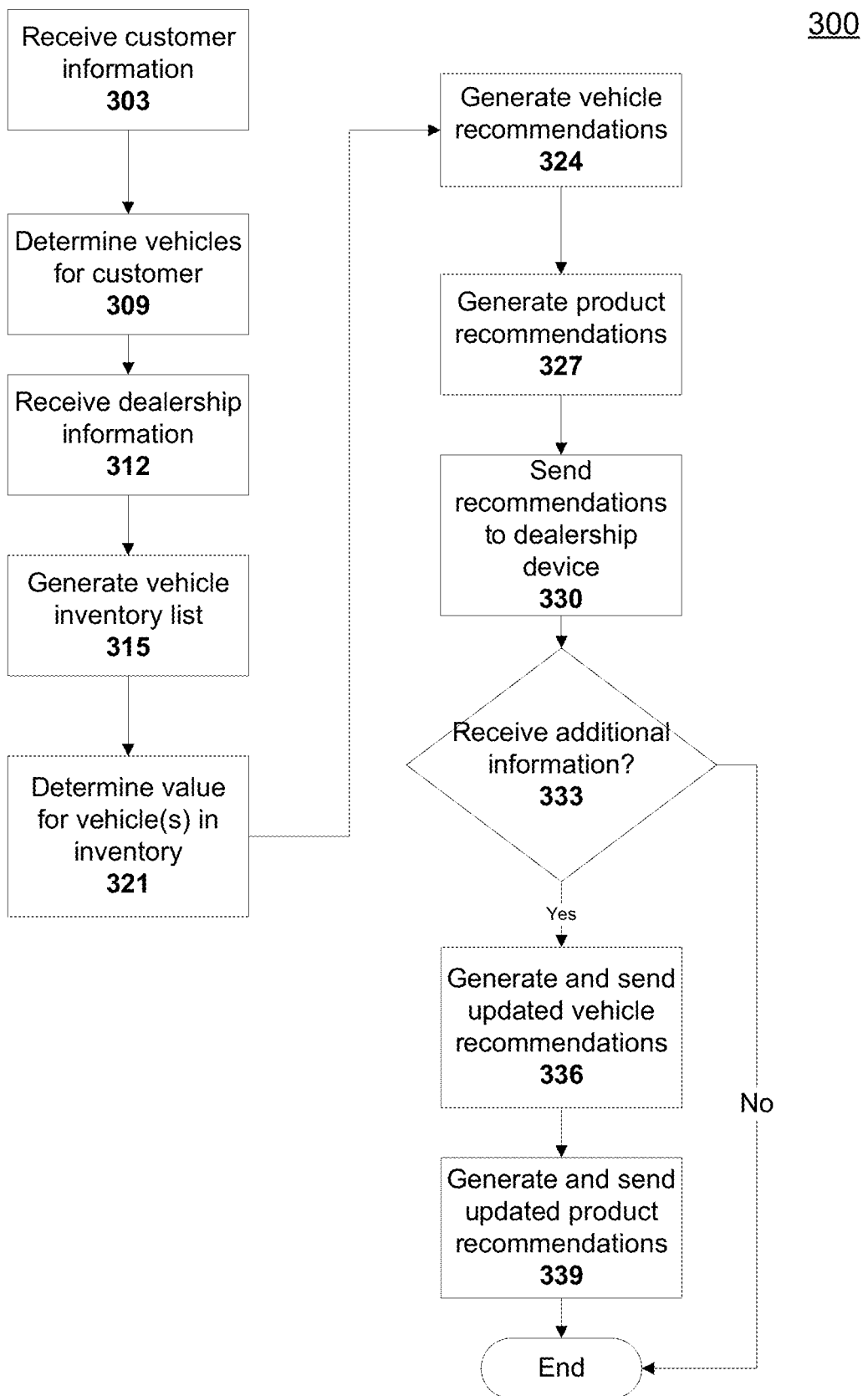
FIG. 3 depicts a flow chart for recommending vehicles according to one or more aspects of the disclosure.

FIG. 3 depicts an exemplary method for recommending vehicles. One, some, or all steps described in FIG. 3 may be performed by one or more components in recommendation system 200. Steps may be performed out of order and/or may be repeated throughout the method.

At step 303, computing device 101 may receive customer information. Customer information may be used to determine whether a customer prequalifies for a loan to be used in the purchase of a vehicle. Customer information may include credit score (e.g., FICO score), date of birth, full name, address, occupation, income, and/or social security number of a customer. Computing device 101 may receive customer information from user device 203 and/or dealership device 205. Customer information may also be received from other third party sources (e.g. credit agency, etc.) and may include, or be used to determine, a risk level associated with the customer (e.g., subprime, near prime, etc.). Customer information may include past customer vehicle owning/leasing history such as what vehicle(s) the customer currently owns, and/or the trade in value of the vehicle(s) that the customer owns. Customer information may include any data corresponding to how the customer uses a vehicle shopping website.

The customer information may include vehicle preference information of the customer. Vehicle preference information may indicate vehicles and/or features of vehicles that the customer is interested in. Vehicle preference information may include browsing history of the customer, vehicle profiles that the customer has saved and/or viewed, vehicle profiles that are similar to the vehicles that the customer has saved and/or viewed, etc. Vehicle profiles may include any type of vehicle information. For example, the vehicle information may include a vehicle identification number, make, model, year, mileage, accident history, and/or repair history of the vehicle. The vehicle preference information may indicate the customer's preferred make, model, year, and/or mileage for a vehicle. The vehicle preference information may indicate features that the customer (e.g., the customer from step 303) is interested in. For example, the features may include body type, color of vehicle, make and/or model of vehicle, type of seats (e.g., leather, etc.), engine type (e.g., 4 cylinder, etc.), safety features (e.g., airbags, automatic braking, blind spot detection, etc.) and/or any other feature. Additionally/alternatively, the vehicle preference information may indicate a specific make, model, and/or year of a vehicle that the customer is interested in purchasing.

The vehicle preference information may be received after the customer visits the dealership. For example, computing device 101 may receive some vehicle preference information from the browsing history on user device 203, and then additional vehicle preference information from dealership device 205 (e.g., when the customer has spoken to a sales associate and the sales associate inputs additional preference information to system 200).

Computing device 101 may use the customer information and pricing model 130 to determine whether the customer may be prequalified for a vehicle loan to purchase a vehicle.

In some embodiments, a prequalification determination may be based on parameters of one or more loan packages (e.g. length of loan term, annual percentage rate, minimum/maximum loan amount, etc.). When the computing device 101 determines whether the customer is prequalified for at least one loan package, the determination may be valid for some time period (e.g., 30 days) before the customer needs to resubmit information for prequalification.

At step 309, computing device 101 may determine prospective vehicles for the customer. The vehicles may be determined using the customer information received in step 303. For example, the customer may qualify for vehicles that are priced below a maximum loan amount that may be given to the customer. The customer may only qualify for some vehicles as determined by pricing model 130. The computing device 101 may generate a list of vehicles that the customer is qualified to purchase based on pricing model 130. Additionally/alternatively, the vehicles may be determined based on a location of the customer. For example, vehicles that are within a 100 mile radius of the customer may be determined by computing device 101.

Additionally/alternatively, vehicles may be determined based on the customer information received in step 303. For example, the list of vehicles may be reduced to include only vehicles that have one or more features that the customer is interested in and/or for which a prospective loan package meets customer financing preferences (e.g. a preferred/budgeted monthly payment amount, length of loan term, etc.).

At step 312, the computing device 101 may receive dealership information. The dealership information may be received from dealership device 205. The dealership information may indicate a number of loans that have been financed using a financing company that is associated with computing device 101. The dealership information may include historical loan information. For example, the loan information may include bank terms, loan terms (e.g., time period of loan, interest rate, monthly payment, etc.), customer details, and/or loan structure from one or more loans of the historical loan information. The loan information may indicate trends specific to a dealership that may reflect a preferred dealership loan structure. The dealership information may include front end products and/or back end products as described below in step 327 of FIG. 3.

In some aspects, the dealership information may include a request generated by the dealership device 205. For example, the dealership device 205 may send a request to computing device 101 for vehicles that meet one or more sales preferences of the dealership based on the customer and information associated with the customer. The request may include any customer information described in step 303. The request may indicate a customer (e.g., using a customer identifier such as a social security number, or other assigned customer identifier) that the computing device 101 has already received customer information for.

At step 315, the computing device 101 may generate a vehicle inventory list corresponding to the dealership associated with dealership device 205. The inventory list may include any vehicle and/or all vehicles that the dealership has in its inventory. The inventory list may include vehicle information corresponding to the vehicles in the list. For example, the vehicle information may include a vehicle identification number, make, model, year, mileage, accident history, repair history, etc. of vehicles in the list. The vehicle information may include the cost of the vehicle that the dealer payed for the car. The vehicle information may include how long the vehicle has been in the inventory of the dealership. The vehicle information may include how much the vehicle has depreciated in value. The vehicle information may include features of each vehicle. For example, the vehicle information may indicate features such as body type (e.g., sedan, SUV, truck, etc.), color, Bluetooth capability, leather seats, navigation, Internet connectivity capabilities, etc.

The vehicle inventory list may be filtered based on the customer information received in step 303. For example, vehicles that do not contain some number of features (e.g., one or more features, three or more features, etc.) that the customer is interested in may be removed from the list. The customer may indicate (e.g., via a user interface on user device 203) which features, and/or the number of features that a vehicle must have to be included in the list. Additionally, vehicles for which a loan structure is not likely to meet customer loan preferences or dealer preferences may also be removed from the list.

At step 321, computing device 101 may determine a value for one or more vehicles in the inventory list. The value may indicate a likelihood that the customer will purchase the vehicle based on the customer's financing, dealership loan structure requirements, and/or vehicle preferences. The value may be based on pricing model 130. For example, computing device 101 may input vehicle, customer, and/or dealership information into pricing model 130 to determine possible loan requirements (e.g., the amount to finance) for which a customer may be prequalified. One or more loan requirements may be configurable within a range. For example, the length or amount to finance may be adjusted. The likelihood that the customer will purchase the vehicle may be determined using the loan requirements (e.g., by adjusting the amount to finance).

The value may be determined based on machine learning software 127 that is trained to approximate the pricing model 130. The machine learning software 127 may use training data 129 to train for approximating the pricing model 130. Training data 129 may include a variety of output from pricing model 130 and corresponding customer, vehicle, and dealership information that pricing model 130 relied on to generate the output. For example, training data 129 may include any number of outputs generated by pricing model 130 in the past using historical customer, vehicle, and dealership information. Machine learning software 127 may take as input customer, vehicle, and dealership information and may output a value. The value may indicate a maximum loan amount and/or the likelihood that the customer will make a purchase. Machine learning software 127 may use any machine learning algorithm to train and generate the value for a vehicle in the inventory list. For example, machine learning software 127 may use one or more neural networks, logistic regression, a random forest, a gradient boosting machine, a support vector machine, ensemble techniques, etc. to train and generate the value.

Computing device 101 may determine how well machine learning software 127 is approximating pricing model 130. Computing device 101 may limit the ability of machine learning software 127 to approximate pricing model 130. For example, computing device 101 may allow machine learning software 127 to train a model to reach a threshold accuracy (e.g., 80%, 90%, 95%, etc.), and then prevent machine learning software 127 from training or improving the model further.

In some aspects, machine learning software 127 may use a loss function to train a model to predict a likelihood or probability of completing a vehicle purchase using customer, vehicle, and/or dealership information. Machine learning software may use techniques to make the prediction by a machine learning model less exact. For example machine learning software 127 may use Root Mean Square Error as the loss function. With Root Mean Square Error, a difference between a value generated by machine learning software 127 (a predicted value) and a value generated by pricing model (actual value) may be determined. If the difference satisfies a threshold (e.g., less than $100, less than $500, etc.), the difference may be replaced with a different dollar amount (e.g., $0). This may prevent machine learning software 127 from achieving a threshold accuracy (e.g., 95% accuracy, 100% accuracy, etc.) in predicting whether a customer will purchase a vehicle, and may prevent dealerships from determining information about pricing model 130.

At step 324, the computing device 101 may generate vehicle recommendations. The vehicle recommendations may be based on the values determined in step 321. For example, computing device 101 may sort the vehicle inventory list by one or more values determined in step 321. The vehicles may be sorted and/or ranked from highest value to lowest value (e.g., highest likelihood of being purchased by a customer to lowest likelihood of being purchased by a customer, most agreeable loan structure for financing the vehicle to least agreeable loan structure, etc.). The vehicle at the top of the list may be the most recommended vehicle, the second vehicle may be the second most recommended vehicle and so on.

Computing device 101 may rearrange the order of the list with some randomness. For example, computing device 101 may swap the position of a predetermined number (e.g., 5, 10, etc.) of items with an item either below or above it on the list. This may prevent a sales associate or other user from determining details about how the pricing model 130 works. The list may include numbers indicating a ranking for each vehicle. The numbers may be displayed on user device 203 and/or dealership device 205. The numbers may be an approximation of the ranking of each vehicle (e.g., the ranking described in step 324). The numbers may be adjusted by adding some noise (e.g., randomly adding or subtracting from the numbers) in a way that does not change the rank ordering of the vehicles in the list. For example, computing device 101 may determine a difference between the likelihood a customer would purchase a vehicle at rank 2 and the likelihood a customer would purchase a vehicle at rank 3 in the list. The likelihood that a customer would purchase a vehicle at rank 3 in the list may be increased (e.g., when displayed to a user) by some random number that is between zero and the difference.

The vehicle recommendations may be based on the customer information received in step 303. For example, computing device 101 may use the list of vehicles and the vehicle preference information of a customer as inputs to the machine learning software 127. Using the machine learning software 127, the computing device 101 may adjust the ordering of the list based on the vehicle preference information. For example, machine learning software 127 may determine a score indicating how likely the customer will purchase each vehicle based on the vehicle preference information and/or the customer's loan preference information (e.g., interest rate preference, loan amount preference, monthly payment preference, etc.). Machine learning software 127 may use an objective function that maximizes both the score indicating how likely the customer will purchase a vehicle and the likelihood that the loan structure will be agreeable to a dealership. Machine learning software 127 may output an overall score for each of the vehicles in the inventory list based on the vehicle preference information. Computing device 101 may sort the list by the overall score. The first vehicle in the list may be the most recommended vehicle, while the last vehicle in the list may be the least recommended vehicle.

As computing device 101 generates recommendations, the machine learning software may adapt over time. The effectiveness of the recommendations may be measured based on whether the customer purchases one of the recommended vehicles. Machine learning software 127 may adjust based on the effectiveness of the recommendations. For example, machine learning software 127 may adjust parameters in a machine learning model used to generate the recommendations. Alternatively, machine learning software may switch to a different model based on the effectiveness of the recommendations (e.g., the model may be switched from a decision tree to a neural network). Machine learning software 127 may adjust or adapt to give more weight to a customer's vehicle preferences and financing preferences. For example, machine learning software 127 may adjust to give more weight to a customer's preferred make and model of a vehicle when generating recommendations. As an additional example, machine learning software 127 may adjust based on overall price of the vehicle or monthly payment amount of a potential loan structure, etc. For example, computing device 101 may determine that a vehicle that makes the dealership a particular amount of money is better to recommend than another vehicle that makes the dealership the same amount or more money but may not meet the customer's financing preferences.

At step 327, the computing device 101 may generate product recommendations. The product recommendations may include combinations of front end and/or back end products for a vehicle. Front end products may include physical things added to a vehicle. For example, front end products may include a bike rack, tires, tow hook, leather seats, etc. Backend products may include warranties (e.g., windshield warranty, tire warranty, drive train warranty, a warranty on a tow hook, and/or any other type of warranty), gap insurance, etc. The product recommendations may be specific to a dealership. Different dealerships may have different products that can be purchased for a vehicle.

The product recommendations may be generated for a particular vehicle. For example, the product recommendations may be generated for the top recommended vehicle for a customer (e.g., the vehicle that is at the top of the list of recommended vehicles). The product recommendations may be ordered by a predicted interest level of the customer in each product or likelihood that the customer will purchase each product.

Machine learning software 127 may be used to recommend products. Machine learning software 127 may learn from historical data (e.g., that may be stored in database 207) which customers purchased what products. Machine learning software may use collaborative filtering, and/or content-based filtering techniques to recommend products. For example, machine learning software 127 may recommend products to the dealership that a particular customer may be interested in based on products that other similar customers have purchased. Machine learning software 127 may predict which product combinations (e.g., for a vehicle and customer) exceed the financing limit for the customer, and may indicate the product combinations to the dealership.

The machine learning software 127 may generate product recommendations based on historical dealership sales or offers. The machine learning software may use data indicating products or combinations of products that the dealership has sold in the past and may generate recommendations of products or product combinations that the customer may be interested in or likely to purchase. Based on the product recommendations, the machine learning software 127 may change the vehicle recommendation. For example, a customer that has been recommended a vehicle in an upper limit for financing may not be able to add additional products because they would exceed the financing limit. The machine learning software 127 may determine an alternative vehicle that would allow additional products to be added without exceeding the financing limit. The alternative vehicle with the additional products may be more preferred to the customer and/or more likely to result in a purchase.

At step 330, computing device 101 may send the recommendations to the dealership device 205. Computing device 101 may, additionally or alternatively, send recommendations to user device 203. At step 333, the computing device 101 may determine whether additional information has been received. The additional information may be received by the computing device 101 from the user device 203 and/or the dealership device 205. If additional information is received then steps 336 and 339 may be performed. If no additional information is received then the method may end.

At step 336, the computing device 101 may generate and send updated vehicle recommendations based on the additional information received. For example, a customer may visit a dealership and after a discussion with a sales associate, the customer may indicate additional features that the customer would like in a vehicle. The sales associate may input the additional features into dealership device 205. The dealership device 205 may send the additional features to computing device 101 and may receive a new list with different orderings of vehicles recommended for the customer. Machine learning software 127 may generate new recommendations based on the additional information.

For example, a customer may tell a sales associate that the customer prefers vehicles that have a Bluetooth connectivity feature. The sales associate may input this additional information into the dealership device 205. Dealership device 205 may receive a list of vehicles with the Bluetooth connectivity feature. The list of vehicles may be ordered by the likelihood of resulting in a purchase based on the customer's financing preferences.

The machine learning model may analyze conversations between the sales associate and the customer. The dealership device 205 may record conversations between the sales associate and the customer and may send the conversations to computing device 101. The machine learning model may identify features that are desired by the customer based on the conversations and may update the list of recommended vehicles based on the conversations. For example, a neural network may be used to recognize additional vehicle features in the conversations and machine learning software 127 may be used to generate vehicle recommendations based on the additional vehicle features identified.

At step 339, the computing device 101 may generate and send updated product recommendations based on the additional information received. The updated product recommendations may be sent to user device 203 and/or dealership device 205. Machine learning software 127 may be used to generate new product recommendations based on the additional information received. For example, the product recommendations generated in step 327 for the customer may have been for a Honda Civic that the customer was interested in. After talking to a sales associate at the dealership, the customer may decide that she is interested in a particular Toyota Corolla. The sales associate may input this additional information into the dealership device 205. The dealership device may send the additional information to the computing device 101. The computing device 101 may determine a list of product recommendations for the Toyota Corolla that are sorted by the likelihood of resulting in a purchase based on the customer's financing and/or vehicle preferences. The likelihood of a purchase by the customer may be maximized by the product recommendations. For example, if the likelihood of purchase of the Toyota Corolla would be maximized by adding a product combination of a bumper cover and an extended warranty, then the bumper cover and extended warranty may be listed as the first product combination. The product combination that would generate the second highest likelihood of purchase may be listed second and so on. In some aspects, a sales associate may specify features to add to the car and may determine how the likelihood of selling the vehicle changes.

Figure 4:
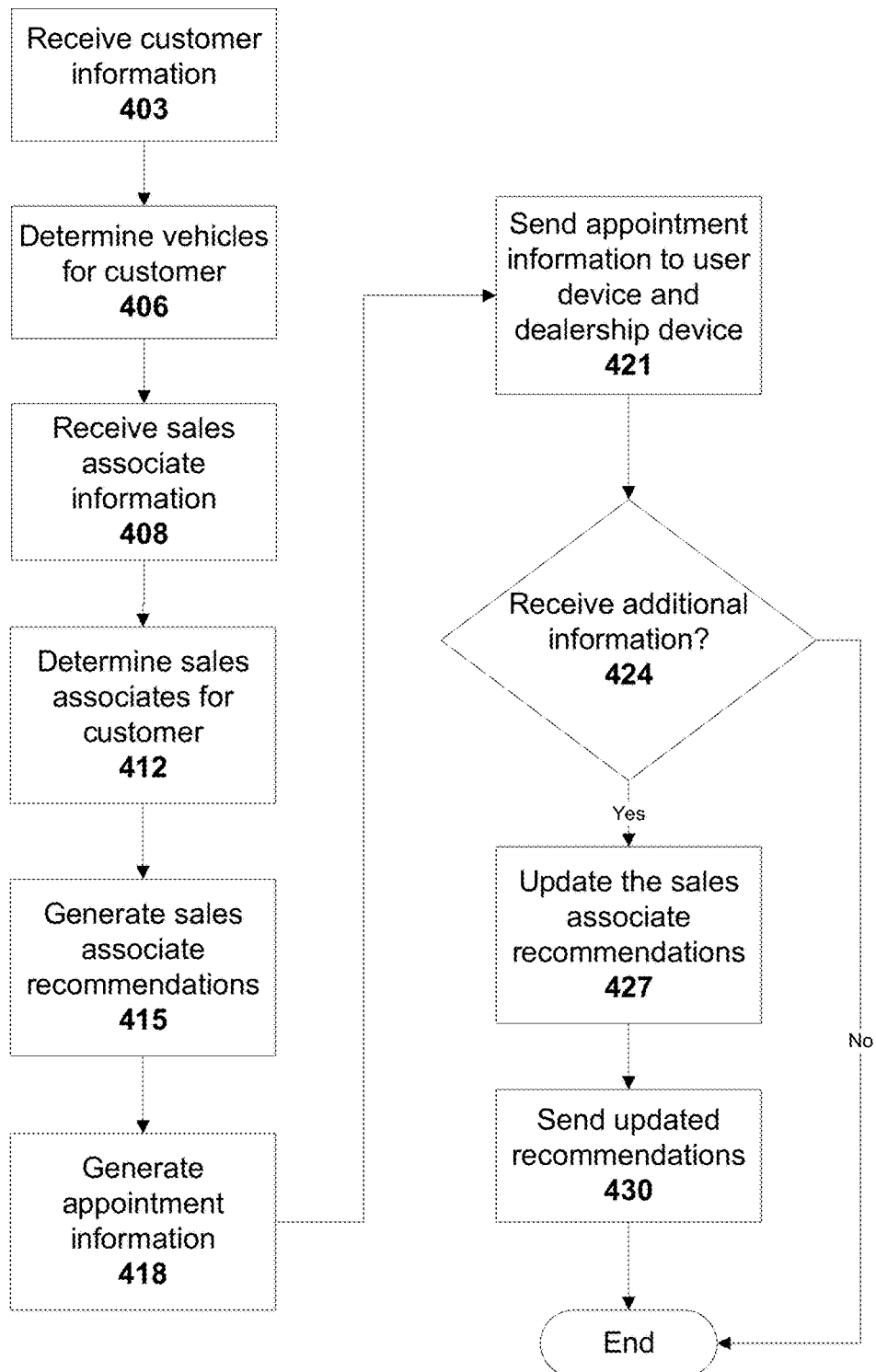
FIG. 4 depicts a flow chart for recommending sales associates according to one or more aspects of the disclosure.

FIG. 4 depicts an exemplary method for recommending sales associates. Steps described in FIG. 4 may be performed by one or more components in recommendation system 200. Steps may be performed out of order and/or may be repeated throughout the method.

At step 403, computing device 101 may receive customer information. The customer information may include any customer information discussed in step 303 of FIG. 3. Computing device 101 may receive customer information from user device 203 and/or dealership device 205.

At step 406, computing device 101 may determine prospective vehicles for the customer. The vehicles may be determined using the customer information received in step 303. For example, the customer may qualify for vehicles that are priced below a maximum loan amount that may be given to the customer. The customer may only qualify for some vehicles as determined by pricing model 130. The computing device 101 may generate a list of vehicles that the customer is qualified to purchase based on pricing model 130. Additionally/alternatively, the vehicles may be determined based on a location of the customer. For example, vehicles that are within a 100 mile radius of the customer may be determined by computing device 101.

At step 408, computing device 101 may receive sales associate information. The sales associate information may be received from the dealership device 205, user device 203, or any other device. The sales associate information may include sales data from previous vehicle sales. The sales data may indicate which sales associate worked on the sale, the amount of loan that was provided to the customer to make the vehicle purchase, and the maximum loan amount that the financing company would have been willing to give to the customer (given the customer, dealer, and vehicle combination that was part of the sale). The sales data may indicate information about the customer that was part of the sale. For example, the sales data may indicate who the customer was, the customer's credit score, income level, marital status, age, address etc. The sales data may include exit survey information received from a customer after a sale is completed. The exit survey information may indicate a level of satisfaction the customer has with the dealership and/or any of the sales associates that assisted with the vehicle sale. The sales data may indicate the length of time a customer spent at a dealership. The sales data may indicate a number of times a customer visited a dealership before the sale was completed. The sales data may indicate whether a sale was completed with a customer or not. The sales associate information may be received periodically and may be updated over time as additional sales are completed.

At step 412, computing device 101 may determine potential sales associates for the customer. Computing device 101 may determine sales associates based on the location of the customer. For example, computing device 101 may determine sales associates that work at dealerships within a 100 mile radius of the customer.

At step 415, computing device 101 may generate sales associate recommendations for the customer. The computing device may use sales associate information corresponding to the sales associates identified in step 412 to generate sales associate recommendations. Additionally, computing device 101 may use the customer information (including e.g., vehicle preference information) received in step 403 to generate sales associate recommendations.

Computing device 101 may generate sales associate recommendations using a weighted average approach. Computing device 101 may determine a weighted score for one or more sales associates and then recommend the sales associate with the highest or lowest score. The score may be based on various vehicle preferences of the customer. For example, the customer's vehicle preferences may include Honda vehicles, sedans, and leather seats. For all Honda vehicle sales performed by a sales associate, computing device 101 may determine the average level of customer satisfaction that the sales associate obtained (e.g., via customer survey data). If a sale was not completed then the customer satisfaction level may be zero. The level of customer satisfaction may be determined (e.g. calculated) for each sales associate and/or for each vehicle preference (e.g., for vehicles that are sedans and for vehicles with leather seats). The satisfaction level for each vehicle preference may be averaged, creating a weighted score for each sales associate. The sales associate with, for example, the highest score (e.g., the sales associate that is able to sell a vehicle with the highest customer satisfaction) may be the top recommended sales associate for the customer, while the sales associate with the lowest score may be the least recommended sales associate for the customer.

Computing device 101 may generate sales associate recommendations by ranking each sales associate based on how well each sales associate performs selling a type of vehicle. The performance of a sales associate for a vehicle may be determined based on the level of satisfaction received from one or more customers. The satisfaction level may indicate a difference between the customer satisfaction level obtained for a customer and a national average satisfaction level that may have been expected. For example, a sales associate may be ranked based on the average difference in customer satisfaction the sales associate achieves for a feature of a vehicle (e.g., body style, vehicle model, price, etc.) and the customer satisfaction other sales associates achieve for similar customers and/or similar features. Features represented by continuous numbers such as price may be bucketed. For example, vehicle price may be bucketed into groups that differ by $5,000 (e.g., vehicles less than $5,000 may be in a first bucket, vehicles between $5,000 and $10,000 may be in a second bucket, vehicles between 10,000 and 15,000 may be in a third bucket).

The rankings of sales associates may be combined across features. For example, each sales associates ranking could be summed across a number of features and the sales associate with the lowest or highest sum may be recommended for a particular customer or vehicle. For example, there may be a Honda Civic sedan that has a price of $16,000. A sales associate may be selected because the associate has achieved the $2^{nd}$ highest customer satisfaction level for Honda vehicles, the highest customer satisfaction level for sedans, and the 4$^{th}$ highest customer satisfaction level for vehicles that are in the 15 k-20 k price bucket (e.g., 2+1+4=7, and no other sales associate has a smaller summed ranking than 7 for this vehicle).

Computing device 101 may generate sales associate recommendations using clustering algorithms Vehicles may be clustered based on their features. Customers may be clustered based on the vehicle features that the customers are interested in. When recommending a sales associate for a vehicle and/or customer, computing device 101 may determine the sales associate that has the highest customer satisfaction level for the feature cluster that is most similar to the vehicle and/or the features the customer is interested in. An unsupervised clustering method may be used to cluster the features (e.g., K-Nearest neighbors). The clustering method may be used separately for each sales associate. A vehicle and/or a customer may be represented by a vector. For example, a vector representation of a vehicle may include values for mileage, price, and year of the vehicle. Categorical vehicle features (e.g., body style, color, etc.) may be converted into numbers. For a sales associate, some number (e.g., 10) of most similar historical vehicles that were previously sold by the sales associate may be determined. The historical vehicles may have similar features to the vehicle or customer for which a recommendation is being generated. Each sales associate may be ranked for a particular vehicle or customer based on the average customer satisfaction level each sales associate had for their similar historical vehicles. A sales associate recommendation for a vehicle and/or customer may be generated based on the ranking of each sales associate. For example, the highest ranked sales associate (determined using the clustering method) may be recommended for a customer and/or vehicle.

Computing device 101 may generate sales associate recommendations for the customer using machine learning software 127. A machine learning model may be trained using the sales associate and customer information. The model may be trained to recommend sales associates that maximize the satisfaction level of a customer. Any type of recommender algorithm may be used to train the machine learning model. For example, neural networks, logistic regression, random forests, and/or gradient boosting machines may be used to generate recommendations. The machine learning model may receive as input customer information and sales associate information and generate a value for each sales associate. The value for each sales associate may be based on a loss function used to maximize or increase customer satisfaction level in a sale. The sales associates may be recommended based on who has the lowest or highest value.

A supervised machine learning model may be trained for each sales associate. A machine learning model may take as input vehicle features and may predict the customer satisfaction level each sales associate may obtain. For each new vehicle that is to be sold, the new vehicle's features may be fed through the model for each sales associate, and a recommendation may be based on the prediction generated by the model. Each sales associate may be assigned a rating that indicates whether one sales associate is just marginally better or significantly better than another sales associate (e.g., at achieving a higher customer satisfaction level).

Computing device 101 may generate a list of recommended sales associates. The list of sales associates may be ordered from most recommended to least recommended. The ordering may be based on the value generated for each sales associate. For example, the first sales associate in the list may have the lowest value and may be the most recommended sales associate. The list may include some number (e.g., the top 10, top 5, etc.) of the most recommended sales associates ranked in order from most recommended to least recommended.

At step 418, computing device 101 may generate appointment information. An appointment may be created for the customer and a sales associate from the list of recommended sales associates. The appointment information may indicate a time and location (e.g., at the dealership where the recommended sales associate works) for the customer to meet the sales associate.

At step 421, computing device 101 may send (e.g., via email, text, recorded message, voice call, or other appropriate communication form) the appointment information to user device 203 and dealership device 205. At step 424, the computing device 101 may determine whether additional information has been received. The additional information may be received by the computing device 101 from the user device 203 and/or the dealership device 205. If additional information is received then steps 427-430 may be performed. If no additional information is received then the method may end. Computing device 101 may receive additional information corresponding to the customer and/or sales associate. For example, a sales associate may determine additional vehicle preferences of the customer during a meeting with the customer.

At step 427, computing device 101 may update the sales associate recommendations. For example, computing device 101 may determine that the customer prefers a different type of vehicle (e.g., a truck). A second sales associate may be better at selling trucks than the currently recommended sales associate. The second sales associate may be recommended by computing device 101 for the customer. At step 430, computing device 101 may send updated sales associate recommendations to the dealership device 205 and/or user device 203.

Some aspects described herein may provide applications for intelligent dealership recommendation engines, such as: providing an interface and/or search functionality for a dealership to determine vehicles to sell to a customer, functionality for a dealership to schedule an appointment with a sales associate that matches with the interests of the customer, and/or functionality that allows a dealership to determine what sales associate to match with a customer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving, from a user device, customer information corresponding to a customer;
determining, by a computing device associated with a vehicle dealership based on the customer information, a first set of vehicles;
determining a second set of vehicles, which is in an inventory of the vehicle dealership, wherein the second set of vehicles is a subset of the first set of vehicles;
determining, using a machine learning model, a pricing model for financing the first set of vehicles;
determining, by the computing device associated with a vehicle dealership and based on an objective maximization function, a value for each vehicle within the second set of vehicles, wherein the value indicates:
  a first probability that the customer will purchase the vehicle, and
  a second probability that a profitability of a sale price of the vehicle is agreeable to the vehicle dealership, and
  wherein the value is determined based on inputting the customer information and vehicle information into the pricing model;
generating a list of vehicles based on the second set of vehicles, sorted by the value for each vehicle; and
outputting, by the computing device associated with a vehicle dealership, the list of vehicles.

2. The method of claim 1, wherein the first probability is associated with one or more customer preferences that the vehicle matches.

3. The method of claim 1, wherein the pricing model indicates a loan structure that is acceptable to the vehicle dealership.

4. The method of claim 1, wherein the customer information comprises at least one of a credit score, a location of the customer, or information indicating an income level of the customer.

5. The method of claim 1, further comprising:
  modifying, based on a machine learning model and the customer information, the list of vehicles before the outputting.

6. The method of claim 5, wherein the machine learning model is trained using data generated by the pricing model, and wherein the data comprises historical vehicle information, historical customer information, and historical dealership information.

7. The method of claim 1, further comprising:
  receiving additional customer information from a second user device associated with the vehicle dealership; and
  updating, based on the additional customer information and the pricing model, the list of vehicles.

8. The method of claim 1, further comprising:
  receiving information indicating a vehicle, from the list of vehicles, that is associated with the customer;
  receiving product information indicating front end purchases for the vehicle; and
  generating, based on the product information, a list of product combinations for the vehicle, wherein the list of product combinations is sorted by a likelihood that the customer will purchase each product combination within the list of product combinations.

9. The method of claim 8, wherein the product information further indicates back end purchases for the vehicle.

10. The method of claim 1, wherein a vehicle's position within the list of vehicles is adjusted based on a random variable prior to the outputting.

11. A computer-implemented method comprising:
  determining, by a computing device associated with a vehicle dealership based on customer information, a first set of vehicles;
  determining a second set of vehicles, which is in an inventory of a vehicle dealership, wherein the second set of vehicles is a subset of the first set of vehicles;
  training a machine learning model using training data comprising historical customer information, historical dealership information, and historical vehicle information;
  determining, using the machine learning model, a pricing model for financing the first set of vehicles;
  determining, based on an objective maximization function, a value for each vehicle within the second set of vehicles, wherein the value indicates:
    a first probability that a customer will purchase the vehicle, and
    a second probability that a profitability of a sale price of the vehicle is agreeable to the vehicle dealership, and
    wherein the value is determined based on inputting the customer information and vehicle information into the pricing model;
  generating a list of vehicles based on the second set of vehicles, sorted by the value for each vehicle; and
  outputting, by the computing device associated with the vehicle dealership, the list of vehicles.

12. The method of claim 11, wherein the training data is generated in part by the pricing model.

13. The method of claim 11, wherein the first probability is associated with one or more customer preferences that the vehicle matches.

14. The method of claim 11, further comprising:
  receiving customer preference information indicating features of a preferred vehicle of the customer; and
  updating the list of vehicles, based on inputting the customer preference information into the machine learning model.

15. The method of claim 14, wherein the customer preference information comprises vehicles viewed online by the customer and second vehicle information saved by the customer.

16. The method of claim 11, wherein a position of a vehicle within the list of vehicles is based on a likelihood, determined by the machine learning model, that the customer will purchase the vehicle.

17. The method of claim 11, further comprising:
  receiving additional customer information from a second user device associated with the vehicle dealership; and
  updating, based on the additional customer information and the machine learning model, the list of vehicles.

18. The method of claim 11, further comprising:
  receiving information indicating a vehicle, from the list of vehicles, that is associated with the customer;
  receiving product information indicating front end purchases for the vehicle; and
  generating, based on the product information, a list of product combinations for the vehicle, wherein the list of product combinations is sorted by a likelihood that the customer will purchase each product combination within the list of product combinations.

19. The method of claim 18, wherein the product information further indicates back end purchases for the vehicle.

20. One or more non-transitory computer-readable media storing instructions that, when executed by one or more processors, cause the one or more processors to perform steps comprising:
  receiving, from a user device, preference information corresponding to a customer, wherein the preference information indicates vehicle features associated with the customer;
  determining, by a computing device associated with a vehicle dealership based on the preference information, a first set of vehicles that the customer is prequalified for financing;
  determining a second set of vehicles, in an inventory of the vehicle dealership, wherein the second set of vehicles is a subset of the first set of vehicles;

training a machine learning model comprising a pricing model for financing the first set of vehicles;
determining, based on the machine learning model and based on an objective maximization function, an order of the second set of vehicles, wherein the order is based on:
  a first probability that the customer will purchase the vehicle, and
  a second probability that a profitability of a sale price of the vehicle is agreeable to the vehicle dealership, and
wherein the order is based on the preference information;
generating, based on the order and the second set of vehicles, a list of vehicles;
outputting, by the computing device associated with the vehicle dealership, the list of vehicles to a computing device associated with the vehicle dealership;
receiving sales data corresponding to a vehicle purchase of the customer; and
updating the machine learning model based on the sales data.

\* \* \* \* \*